United States Patent [19]

Montagu et al.

[11] Patent Number: 4,525,030
[45] Date of Patent: Jun. 25, 1985

[54] POSITIONER FOR OPTICAL ELEMENT

[75] Inventors: Jean I. Montagu, Brookline; Kurt A. Pelsue, Wayland, both of Mass.

[73] Assignee: General Scanning Inc., Watertown, Mass.

[21] Appl. No.: 412,020

[22] Filed: Aug. 26, 1982

[51] Int. Cl.³ .................................................. G02B 7/04
[52] U.S. Cl. ........................................ 350/255; 74/108
[58] Field of Search .................... 350/255, 6.1, 6.3; 369/45; 310/20, 37; 335/219, 228, 269; 74/10.7, 89.2, 108

[56] References Cited

U.S. PATENT DOCUMENTS

| Re. 26,749 | 1/1970 | Montagu | 335/229 |
|---|---|---|---|
| 1,953,805 | 4/1934 | Hegel | 74/108 |
| 2,233,248 | 2/1941 | Douglas | 74/108 |
| 3,434,082 | 3/1969 | Montagu | 335/229 |
| 3,614,898 | 10/1971 | Paine | 74/89.2 |
| 3,624,574 | 11/1969 | Montagu | 335/230 |
| 3,970,979 | 7/1976 | Montagu | 335/229 |
| 4,103,191 | 7/1978 | Kawamura et al. | 310/49 R |
| 4,238,962 | 12/1980 | Taenzer | 74/108 |
| 4,366,722 | 1/1983 | Hasler | 74/108 |

FOREIGN PATENT DOCUMENTS 120006  9/1980  Japan ..................................... 350/255

OTHER PUBLICATIONS

Mizoshita et al., "Mechanical and Servo Design of a 10 Inch Disk Drive", IEEE Transactions on Magnetics, vol. MAG-17, No. 4, Jul. 1981, pp. 1387-1391.

Winfrey et al., "Design of a High Performance Rotary Positioner for a Magnetic Disk Memory", IEEE Transactions on Magnetics, vol. MAG-17, No. 4, Jul. 1981, pp. 1392-1395.

Hardman et al, "Lens Drive Wear Mechanism", IBM Tech. Disc. Bull., 8-1976, p. 804.

Primary Examiner—William H. Punter

[57] ABSTRACT

An optical element positioner in which a carriage holding the optical element is driven in response to electrical control signals to selected locations along an optical path by a moving-iron, limited-rotation actuator, with the reflected load inertia substantially matched to the actuator rotor and crank arm inertia.

5 Claims, 5 Drawing Figures

POSITIONER FOR OPTICAL ELEMENT

BACKGROUND OF THE INVENTION

This invention relates to apparatus for positioning an optical element at selected locations along an optical path.

In typical positioners for optical elements, the optical element rides on a carriage which moves along an optical axis and a motor is connected to drive the carriage between selectable positions along this axis. Prior positioners have had disadvantages such as relatively large mass, long response time and high cost that have made them disadvantageous or entirely impractical for various applications.

SUMMARY OF THE INVENTION

The invention features a carriage for holding the optical element, driven through a crank arm by a moving-iron, limited rotation actuator (or galvanometer), with the length of the crank arm connecting the actuator shaft to the carriage being arranged to cause the reflected inertia of the carriage to substantially match the inertia of the actuator rotor.

In preferred embodiments, a taut, flexible metal band translates the rotary motion of the actuator to linear motion of the carriage without permitting any free play, the axis of the shaft is spaced from and parallel to a plane containing the optical path, and the crank arm and taut band lie in a plane perpendicular to the axis of the rotor.

The positioner can operate quickly and accurately to precisely position the optical element at selected locations and can be made at low cost.

Other features and advantages will be apparent from the following description of the preferred embodiment and from the claims.

DESCRIPTION OF THE PREFERRED EMBODIMENT

We first briefly describe the drawings.

DRAWINGS

STRUCTURE AND OPERATION

Figure 1:
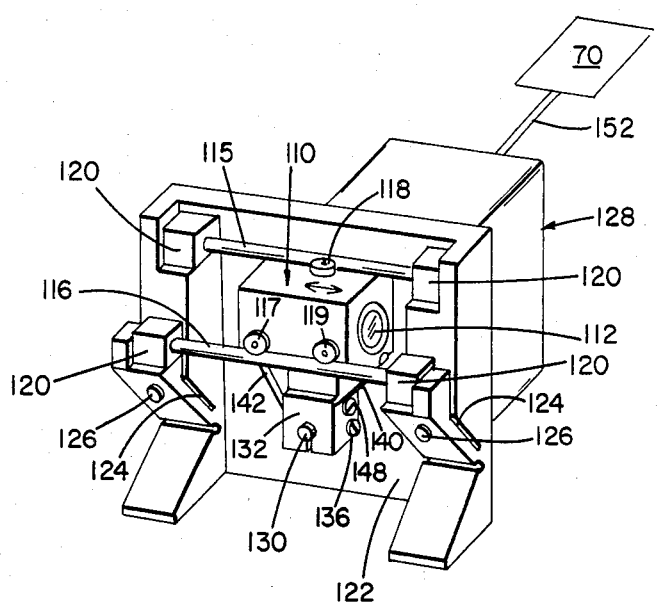
FIG. 1 is an isometric view of a lens positioner partially cut away to expose the top of the actuator and the ends of the guide rods.
Figure 2:
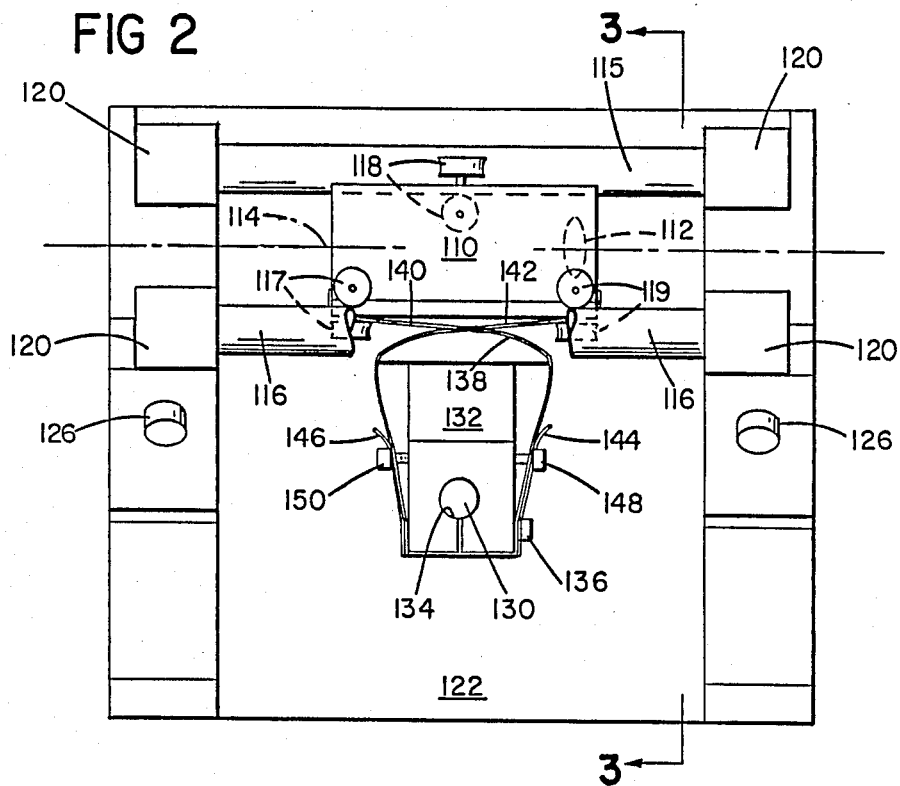
FIG. 2 is a top view of the lens positioner of FIG. 1.
Figure 3:
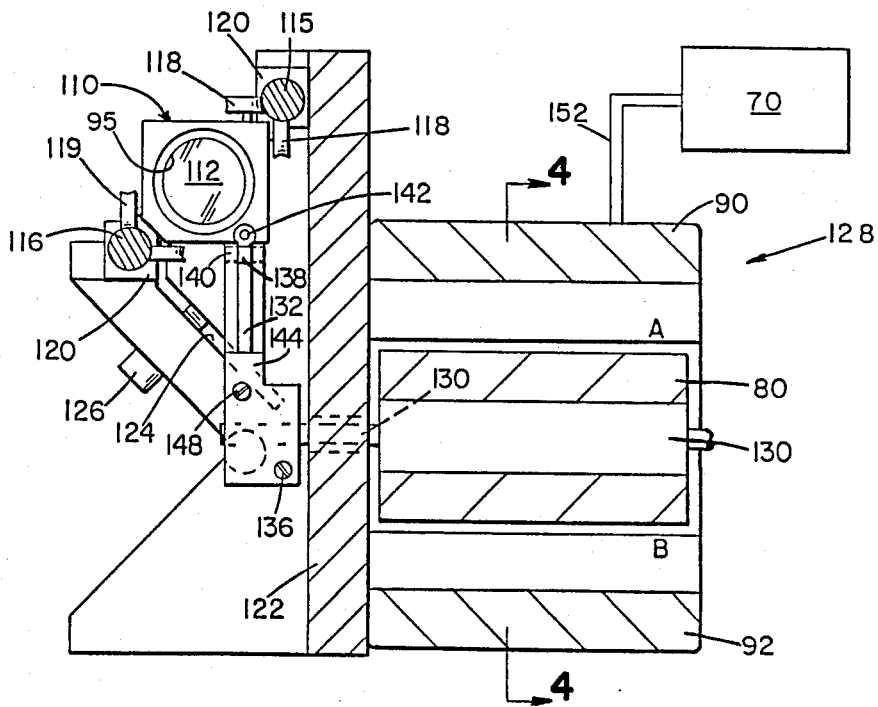
FIG. 3 is a sectional side view (at 3—3 in FIG. 2) of the lens positioner of FIG. 1.

Referring to the FIGS. 1, 2 and 3, carriage 110 (i.e., a shuttle assembly) holds lens assembly 112 and defines a straight optical axis 114 oriented along the length of the carriage with the optical axis passing through lens assembly 112. Carriage 110 rides back and forth along axis 114 on two guide rods 115, 116 which are held parallel to and on opposite sides of the optical axis. The carriage moves on three pairs of wheels 117, 118, 119 held in ball bearings mounted on the carriage. One pair 118 is mounted at one point along the axis and ride (at right angles to one another, see FIG. 3) on one of the guide rods 115. The other two pairs of wheels 117, 119 are mounted at two other points along the optical axis and the two wheels of each pair ride (at right angles to one another) on the second guide rod 116. Each of the guide rods is supported at both ends by mounts 120 which are attached to base 122. Slot 124 in base 122 permits a small amount of relative movement between the two rods to permit precise alignment of the rods, using adjusting screws 126 (shown in FIG. 2).

Rotary actuator 128 is mounted on base 122 with the axis of the rotor shaft 130 perpendicular to the plane of the optical axis and offsets to one side of the axis by a small distance (e.g., 1 inch). Shaft 130 is linked to the carriage by a taut-band drive mechanism consisting of crank arm 132 having on one end a compressible mounting ring 134 which is held tightly on the shaft by screw 136. The other end of the crank arm has a curved surface 138 over which a pair of taut bands 140, 142 lie. Taut band 142 is a single thin flexible sheet metal element. It is attached to one end of the carriage, passes about the curved end surface of the crank arm, and is attached to the opposite side of the crank arm. Taut band 140 comprises a pair of parallel flexible sheet metal band elements and is similarly attached to the other end of the carriage and passes about the curved end surface of the crank arm to a point of attachment on the other side of the crank arm. The space between the parallel band elements of band 140 is sufficiently wide to accommodate band 142 and the two bands are so mounted that as the crank arm rotates on the motor shaft, the bands do not obstruct each other. Bands 140, 142 are attached to the crank arm by means of tension control strips 144, 146 having tension adjusting screws 148, 150 for adjusting the tension on band 140.

Actuator 128 is connected to a controlled source of power 70 by wires 152.

The length of the crank arm and the maximum excursion angle of the motor are chosen to generally match the inertia of the rotor shaft to the inertia of the translating carriage.

Figure 4:
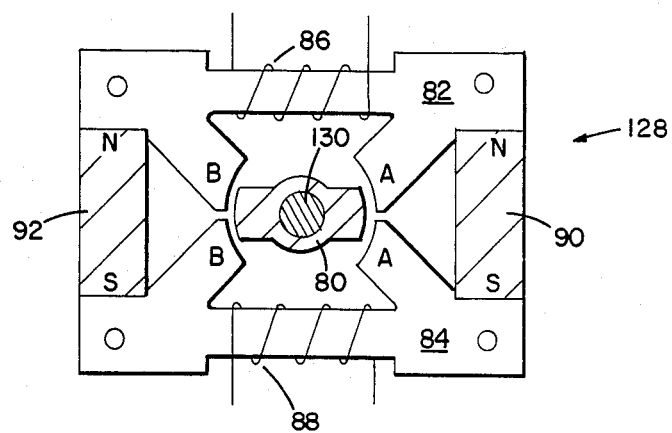
FIG. 4 is a cross-sectional view of the actuator of FIG. 3 (at 4—4 in FIG. 3).

Referring to FIGS. 3, 4, actuator 128 is a moving-iron galvanometer characterized by a moving-iron rotor 80, a pair of pole pieces 82, 84 each defining a pair of pole faces A, B, a pair of drive coils 86, 88 associated respectively with the pole pieces for generating a control flux, and a pair of permanent magnets, 90, 92 connected between the pole pieces to produce a bias flux. Further details of such a galvanometer are set forth in the U.S. Pat. No. 3,624,574, issued Nov. 30, 1971 to the same assignee as this application and incorporated herein by reference. A suitable galvanometer is General Scanning Incorporated Model G360PD or G300PD having a torque of 2000 gram—centimeter, an inertia of 6 and 4 gram—$cm^2$, respectively, an angular excursion of 60 degrees, peak-to-peak, and dimensions of 4.6×4.6×5.0 cm. The crank arm has a radius of 1 inch and an inertia of 5 gram—$cm^2$. The linear travel of the carriage is 0.5 cm. peak-to-peak, and the clear opening 95 in the carriage is 1 cm. in diameter for mounting the lens. The approximate linear travel time, peak-to-peak, is 5 milliseconds.

Figure 5:
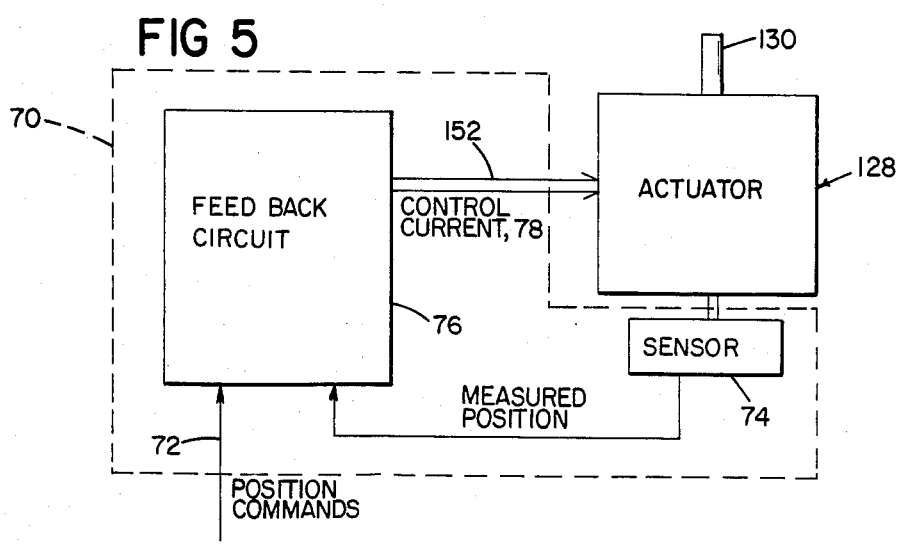
FIG. 5 is a block diagram of a feedback-driven, controlled current source for the actuator.

Referring to FIG. 5, controlled current source 70 typically comprises a source of position command signals 72, a rotor position sensor 74 (connected to the shaft of the actuator), and a suitable feedback circuit 76. The feedback circuit, in a manner known in general for galvanometers, regulates the control current 78 in accordance with an error signal based upon the difference between actual and desired lens position, thus to enable the rotor to accurately follow the command signals in a suitably damped manner. This enables rapid and accurate positioning of the carriage at any desired position on the optical axis. (Details of one useful control circuit are set forth in U.S. Pat. No. 4,142,144, Rohr, Feb. 27, 1979, assigned to the same assignee as this application and hereby incorporated by reference.)

Other embodiments are within the claims. E.g., the lens assembly can be a mirror or other optical element.

We claim:

1. Apparatus for positioning an optical element at selected locations along an optical axis, comprising
   a carriage on which said optical element is mounted,
   support and guide means for holding said carriage, and confining it to substantially linear motion along said axis,
   a moving-iron, limited-rotation actuator having a rotor and a rotor shaft rotatable over a range of angular excursions within a maximum operational angular excursion defined by the configurations of the stator and rotor pole faces of said actuator,
   a crank arm connecting the shaft of said actuator to said carriage and arranged to drive said carriage in linear motion when the shaft of said actuator rotates,
   the length of said crank arm being arranged with respect to said maximum operational angular excursion of said shaft to substantially match the inertia of said crank arm and the rotor of said actuator to the reflected inertia of said carriage, and
   control means adapted to apply electrical signals to said actuator to controllably vary the rotary position of said rotor of said moving-iron, limited-rotation actuator and thereby the position of said optical element along said axis.

2. The positioning apparatus of claim 1 further comprising, intermediate said crank arm and said carriage, means for translating the rotary motion of said crank arm about said shaft to the linear motion of said carriage, said means for translating being arranged to prevent substantially all free play between said rotary motion and said linear motion.

3. The positioning apparatus of claim 2 wherein said means for translating comprises at least one taut flexible metal band, fixed at one end to said carriage and at the other end to said crank arm, and so arranged that an increment of said rotary motion produces a corresponding precise increment of said linear motion.

4. The positioning apparatus of claim 3 wherein the axis of said shaft is spaced from and parallel to a plane containing said optical path, and said crank arm and said band lie in a plane perpendicular to said axis.

5. The positioning apparatus of claim 1 wherein said control means for said rotary actuator include a source of position command signals and a feedback system sensitive to the rotary condition of said actuator, constructed and arranged to cause said rotor to follow the command signals in a suitably damped manner.

* * * * *